United States Patent Office 3,498,999
Patented Mar. 3, 1970

---

3,498,999
1-PHENOXY AND SUBSTITUTED PHENOXY-3-(5-TETRAZOLYL) PROPANES
Ronald Leslie Buchanan, Fayetteville, and Richard Anthony Partyka, Liverpool, N.Y., assignors to Bristol-Myers Company, New York, N.Y., a corporation of Delaware
No Drawing. Filed Apr. 20, 1966, Ser. No. 543,812
The portion of the term of the patent subsequent to Aug. 22, 1984, has been disclaimed
Int. Cl. C07d 55/56
U.S. Cl. 260—308
10 Claims

ABSTRACT OF THE DISCLOSURE 1-phenoxy and substituted phenoxy-3-(5 - tetrazolyl)-propanes possess hypocholesterolemic activity and are useful for lowering blood cholesterol level.

---

This invention relates to novel compounds. More particularly, this invention relates to novel compounds which possess valuable therapeutic utility as hypocholesterolemic agents and to processes useful in the preparation thereof.

It is an object of this invention to provide a new class of therapeutic compounds. It is another object of this invention to provide novel compounds having hypocholesterolemic activity. It is a further object of the present invention to provide a process for preparing the novel therapeutic compounds. It is still a further object of the present invention to provide a novel method of lowering blood cholesterol level.

These and other objects which may appear as the specification proceeds are achieved by this invention which comprises the provision of compounds selected from the group consisting of compounds having the following formula (I)

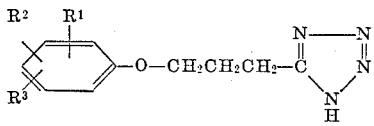

wherein $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)alkoxy, nitro, phenyl, phenoxy and benzyl, and the pharmaceutically acceptable nontoxic salts thereof.

The pharmaceutically acceptable nontoxic salts of the compounds of this invention include the nontoxic metallic salts such as sodium, potasssium, calcium, aluminum and the like, the ammonium salt and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylenediamine, dehydroabietylamine N,N'-bis-dehydroabietylethylenediamine, N-(lower)alkylpiperidine, e.g. N-ethylpiperidine, morpholine, dimethylamine, methylcyclohexylamine, glucosamine and other amines which have been used to form salts with benzylpenicillin. The salts of the compounds of this invention are prepared by conventional procedures described in the chemical literature.

The term "(lower)alkyl" as used herein means both straight and branched chain aliphatic hydrocarbon radicals having from 1 to 8 carbon atoms, e.g. methyl, ethyl, propyl, isopropyl, butyl, isobutyl, sec-butyl, t-butyl, amyl, 2-ethylhexyl, octyl, etc.

Similarly, where the term "(lower)" is used as part of the description of another group, e.g., (lower)alkoxy, it refers to the alkyl portion of such group which is therefore as described in connection with (lower)alkyl.

A preferred group of compounds of the present invention are those of Formula I wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro. In a more preferred embodiment at least one of $R^1$, $R^2$ and $R^3$ is chloro, bromo, fluoro, iodo or trifluoromethyl.

The compounds of this invention have a high degree of hypocholesterolemic activity, and exhibit low toxicity, making them potent hypocholesterolemic agents, and are useful for lowering serum cholesterol.

Hypocholesterolemic tests of the compounds of the present invention were carried out by administering the compounds (suspended in 0.5% carboxymethylcellulose solution) at a dose of 400 mg./kg. p.o. to rats once daily for 4 days. The control rats were treated similarly with the same volume dose of 0.5% carboxmethylcellulose only. Starting the evening of the fourth day, the rats were fasted. On the fifth day, the serum of the treated rats and control rats was analyzed for cholesterol, and the cholesterol content compared. The results is expressed as the percentage decrease in serum cholesterol.

In the test described above, a preferred compound of the present invention having the formula (II)

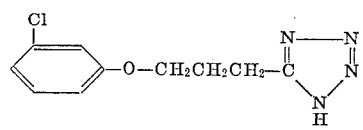

1-(m-chlorophenoxy)-3-(5-tetrazolyl)propane gave the following percentage decrease in serum cholesterol at the dosages in mgm./kg. given in parentheses: 38 (400), 38 (200), 15 (100). Thus, this compound is a very potent hypocholesterolemic agent.

The compounds of the present invention corresponding to Formula I were preferably prepared as exemplified below by reacting a nitrile of the formula (III)

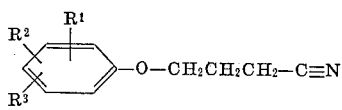

wherein $R^1$, $R^2$ and $R^3$ are as described above, with at least an equimolar weight of an azide and preferably an inorganic azide, e.g. sodium azide, lithium azide, tetramethylammonium azide, trimethylammonium azide, ammonium azide, aluminum azide, morpholinium azide, piperidinium azide or hydrazoic acid, in a liquid (and preferably anhydrous) medium for at least 12 hours at temperatures above room temperature and preferably in the range of about 80° C. to about 140° C. If desired, there may be added as a catalyst a Lewis acid, e.g. boron trifluoride-etherate, tetra-alkylammonium chlorides, aniline hydrochloride, ammonium chloride, lithium chloride. Suitable liquid media include the monomethyl and ethyl ethers of ethylene and diethylene glycol and tetrahydrofuran, n-butanol and particularly dimethyl sulfoxide and dimethylformamide. The azidic compound may be added per se or prepared in situ. In particular, use may be made of the procedures of United States Patents 2,977,372, 3,155,666, 3,123,615 and those given by McManus et al., J. Org. Chem. 24, 1464 (1959); Finnegan et al., J. Amer. Chem. Soc. 80, 3908–3911 (1958); F. R. Benson, Chem. Rev. 41, 1 (1947); or in E. H. Rodd, Chemistry of Carbon Compounds, IV, 481–486, D. H. Van Nostrand Co., Inc., New York, N.Y. (1957); or in the references cited therein for the preparation of 5-substituted tetrazoles.

The nitriles of Formula III are compounds which are either commercially available, well known in the art, or easily prepared in accordance with standard organic procedures previously described in the chemical literature. For example, various nitriles are described in United States Patents 2,977,372 and 3,139,455 and in German Patent 670,357.

The nitriles of Formula III can be conveniently prepared by the following reaction schemes:

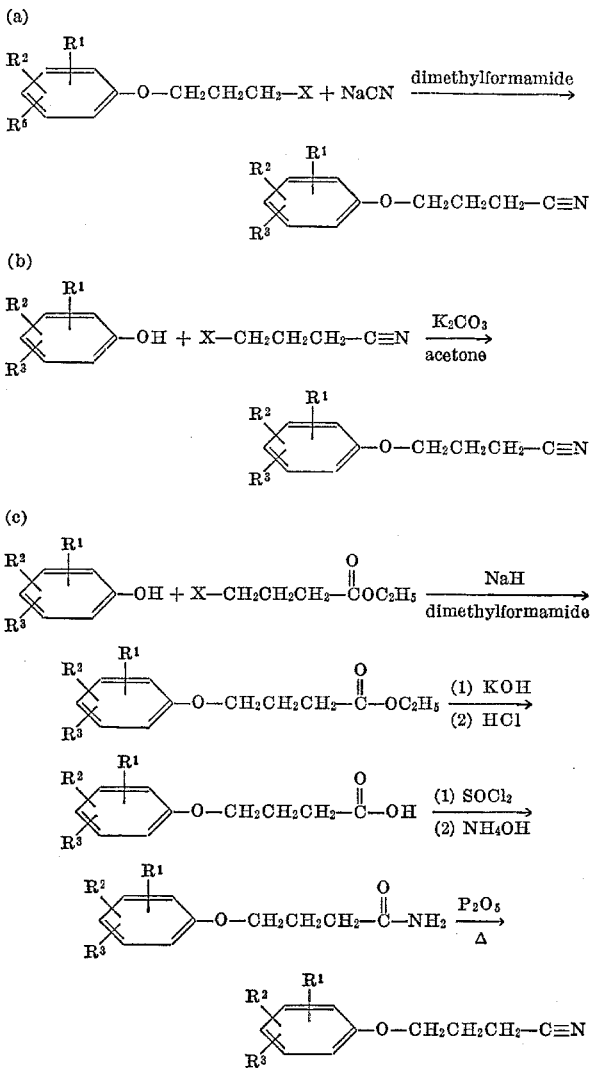

wherein $R^1$, $R^2$ and $R^3$ are as described above, and X is chloro or bromo.

The phenoxy propanes used as reactants in reaction scheme (a) above art either known compounds or can be prepared by methods described in the literature, for example, they are conveniently prepared by the procedure described by Genzer et al., J. Amer. Chem. Soc., 73, 3159 (1951).

The compositions of this invention when administtred be administtred in their free form or in the form of their nontoxic salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compositions of this invention when administered orally or parenterally, in an effective amount, are effective in lowering serum cholesterol.

The following examples are intended to illustrate the invention described herein without unduly restricting it.

EXAMPLE A-1

Preparation of γ-(3-chlorophenoxy)butyronitrile

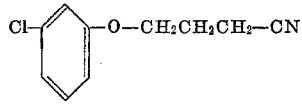

A mixture of 1-bromo-3-(m-chlorophenoxy)propane [Genzer et al., J. Amer. Chem. Soc. 73, 3159 (1951)] (15.0 g., 0.06 mole) and sodium cyanide (2.94 g., 0.06 mole) in 100 ml. of dry dimethylformamide was stirred and heated at 90–100° C. for 5½ hours. The mixture was poured into 300 ml. of water, extracted with ether and the ether extracts were washed with water and dried over anhydrous magnesium sulfate. Removed of the ether and distillation of the residual oil yielded 7.3 g. of γ-(3-chlorophenoxy)-butyronitrile (B.P. 113–120° C. at 0.07 mm.). Infrared and N.M.R. spectra were consistent with the structure.

EXAMPLE A-2

When, in the procedure of Example A-1, 1-bromo-3-(m-chlorophenoxy)propane is replaced by an equal molar amount of 1-bromo-3-(4-chlorophenoxy)propane,
1-bromo-3-(phenoxy)propane,
1-bromo-3-(4-bromophenoxy)propane,
1-bromo-3-(4-methoxyphenoxy)propane,
1-bromo-3-(2-chlorophenoxy)propane,
1-bromo-3-(4-fluorophenoxy)propane,
1-bromo-3-(2-trifluoromethylphenoxy)propane,
1-bromo-3-(4-nitrophenoxy)propane,
1-bromo-3-(4-phenylphenoxy)propane,
1-bromo-3-(2,6-dichlorophenoxy)propane,
1-bromo-3-(4-trifluoromethylphenoxy)propane,
1-bromo-3-(4-benzylphenoxy)propane,
1-bromo-3-(4-methylphenoxy)propane,
1-bromo-3-(3-dimethylaminomethoxyphenoxy)propane,
1-bromo-3-(3-propylphenoxy)propane,
1-bromo-3-(2-iodophenoxy)propane,
1-bromo-3-(2-trifluoromethylphenoxy)propane,
1-bromo-3-(3-ethoxyphenoxy)propane,
1-bromo-3-(4-dimethylaminophenoxy)propane,
1-bromo-3-(4-diethylaminophenoxy)propane,
1-bromo-3-(3-fluorophenoxy)propane,
1-bromo-3-(3-bromophenoxy)propane,
1-bromo-3-(3-phenoxyphenoxy)propane,
1-bromo-3-(4-methylthiophenoxy)propane,
1-bromo-3-(3-methylphenoxy)propane,
1-bromo-3-(2-chloro-4-methylphenoxy)propane,
1-bromo-3-(2,4-dichlorophenoxy)propane,
1-bromo-3-(2,4,6-trichlorophenoxy)propane,
1-bromo-3-(2-methoxyphenoxy)propane and
1-bromo-3-(3-methoxyphenoxy)propane, there are obtained:

γ-(4-chlorophenoxy)butyronitrile,
γ-(phenoxy)butyronitrile,
γ-(4-bromophenoxy)butyronitrile,
γ-(4-methoxyphenoxy)butyronitrile,
γ-(2-chlorophenoxy)butyronitrile,
γ-(4-fluorophenoxy)butyronitrile,
γ-(2-trifluoromethylphenoxy)butyronitrile,
γ-(4-nitrophenoxy)butyronitrile,
γ-(4-phenylphenoxy)butyronitrile,
γ-(2,6-dichlorophenoxy)butyronitrile,
γ-(4-trifluoromethylphenoxy)butyronitrile,
γ-(4-benzylphenoxy)butyronitrile,
γ-(4-methylphenoxy)butyronitrile, γ-(3-dimethylaminomethoxyphenoxy)butyronitrile,
γ-(3-propylphenoxy)butyronitrile,
γ-(2-iodophenoxy)butyronitrile,
γ-(2-trifluoromethylphenoxy)butyronitrile,
γ-(3-ethoxyphenoxy)butyronitrile,
γ-(4-dimethylaminophenoxy)butyronitrile,
γ-(4-diethylaminophenoxy)butyronitrile,
γ-(3-fluorophenoxy)butyronitrile,
γ-(3-bromophenoxy)butyronitrile,
γ-(3-phenoxyphenoxy)butyronitrile,
γ-(4-methylthiophenoxy)butyronitrile,
γ-(3-methylphenoxy)butyronitrile,
γ-(2-chloro-4-methylphenoxy)butyronitrile,
γ-(2,4-dichlorophenoxy)butyronitrile,
γ-(2,4,6-trichlorophenoxy)butyronitrile,
γ-(2-methoxyphenoxy)butyronitrile and
γ-(3-methoxyphenoxy)butyronitrile, respectively.

EXAMPLE B–1

Preparation of 1-(m-chlorophenoxy)-3-(5-tetrazolyl)-propane

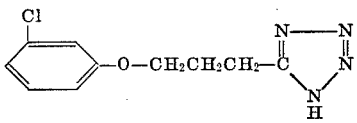

A mixture of γ-(3-chlorophenoxy)butyronitrile (7.6 g., 38.9 mmole), sodium azide (2.6 g., 40 mmole) and ammonium chloride (2.14 g., 40 mmole) in 50 ml. of dimethylformamide was stirred and heated at 90–100° C. for 17 hours. Most of the dimethylformamide was evaporated off under reduced pressure, water was added and the mixture was acidified with 6 N sulfuric acid. The yellow oil which separated was extracted into ether. The ether extracts were then washed with water and extracted with saturated sodium bicarbonate solution. The tetrazole was obtained as a solid by acidifying the bicarbonate extract with concentrated hydrochloric acid and cooling in an ice bath (5.0 g.). Two recrystallizations from chloroform-carbon tetrachloride gave the product, 1-(m-chlorophenoxy)-3-(5-tetrazolyl)propane, M.P. 84–86° C.

Analysis.—Calc'd for $C_9H_{11}ClN_4O$ (percent): C, 50.32; H, 4.65; N, 23.48. Found (percent): C, 50.07; H, 4.63; N, 23.48.

EXAMPLE B–2

When, in the procedure of Example B–1, γ-(3-chlorophenoxy)butyronitrile is replaced by an equal molar amount of each of the products of Example A–2, there are obtained:

1-(4-chlorophenoxy)-3-(5-tetrazolyl)propane,
1-(phenoxy)-3-(5-tetrazolyl)propane,
1-(4-bromophenoxy)-3-(5-tetrazolyl)propane,
1-(4-methoxyphenoxy)-3-(5-tetrazolyl)propane,
1-(2-chlorophenoxy)-3-(5-tetrazolyl)propane,
1-(4-fluorophenoxy)-3-(5-tetrazolyl)propane,
1-(2-trifluoromethylphenoxy)-3-(5-tetrazolyl)propane,
1-(4-nitrophenoxy)-3-(5-tetrazolyl)propane,
1-(4-phenylphenoxy)-3-(5-tetrazolyl)propane,
1-(2,6-dichlorophenoxy)-3-(5-tetrazolyl)propane,
1-(4-trifluoromethylphenoxy)-3-(5-tetrazolyl)propane,
1-(4-benzylphenoxy)-3-(5-tetrazolyl)propane,
1-(4-methylphenoxy)-3-(5-tetrazolyl)propane,
1 - (3 - dimethylaminomethoxyphenoxy)-3-(5-tetrazolyl)-propane,
1-(3-propylphenoxy)-3-(5-tetrazolyl)propane,
1-(2-iodophenoxy)-3-(5-tetrazolyl)propane,
1-(2-trifluoromethylphenoxy)-3-(5-tetrazolyl)propane,
1-(3-ethoxyphenoxy)-3-(5-tetrazolyl)propane,
1-(4-dimethylaminophenoxy)-3-(5-tetrazolyl)propane,
1-(4-diethylaminophenoxy)-3-(5-tetrazolyl)propane,
1-(3-fluorophenoxy)-3-(5-tetrazolyl)propane,
1-(3-bromophenoxy)-3-(5-tetrazolyl)propane,
1-(3-phenoxyphenoxy)-3-(5-tetrazolyl)propane,
1-(4-methylthiophenoxy)-3-(5-tetrazolyl)propane,
1-(3-methylphenoxy)-3-(5-tetrazolyl)propane,
1-(2-chloro-4-methylphenoxy)-3-(5-tetrazolyl)propane,
1-(2,4-dichlorophenoxy)-3-(5-tetrazolyl)propane,
1-(2,4,6-trichlorophenoxy)-3-(5-tetrazolyl)propane,
1-(2-methoxyphenoxy)-3-(5-tetrazolyl)propane and
1-(3-methoxyphenoxy)-3-(5-tetrazolyl)propane, respectively.

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

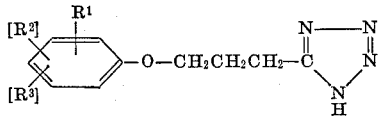

wherein $R^1$ is a member selected from the group consisting of hydrogen, chloro, bromo, fluoro, iodo, and trifluoromethyl, and the pharmaceutically acceptable nontoxic salts thereof.

2. The compound of claim 1 having the formula

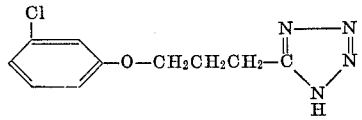

3. A pharmaceutically acceptable nontoxic salt of the compound of claim 2.

4. The compound of claim 1 having the formula

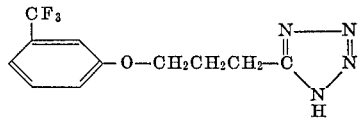

5. The compound of claim 1 having the formula

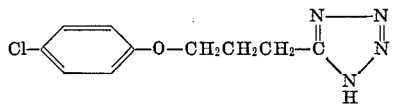

6. The compound of claim 1 having the formula

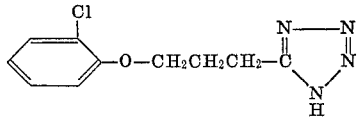

7. The compound of claim 1 having the formula

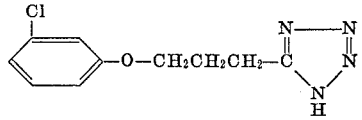

8. The compound of claim 1 having the formula

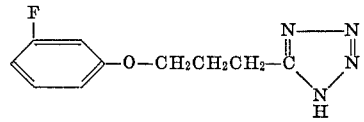

9. The compound of claim 1 having the formula

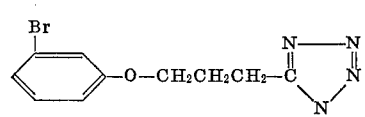

10. The compound of claim 1 having the formula
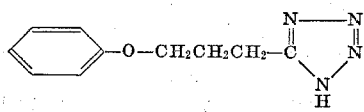
References Cited
UNITED STATES PATENTS
3,337,576  8/1967  Buchanan et al. _____ 260—308
OTHER REFERENCES
Burger: Medicinal Chemistry (New York, 1960), pp. 77–78.
ALTON D. ROLLINS, Primary Examiner
U.S. Cl. X.R.
260—211, 465, 247.5, 470, 294.7, 299, 471, 473, 559, 516, 519, 521, 612, 570.7, 574; 424—248, 267, 269

PO-1050
(5/69)

UNITED STATES PATENT OFFICE
CERTIFICATE OF CORRECTION

Patent No. 3,498,999          Dated March 3, 1970

Inventor(s)  Ronald Leslie Buchanan and Richard A. Partyka

It is certified that error appears in the above-identified patent and that said Letters Patent are hereby corrected as shown below:

In Claim 7, the formula should read:

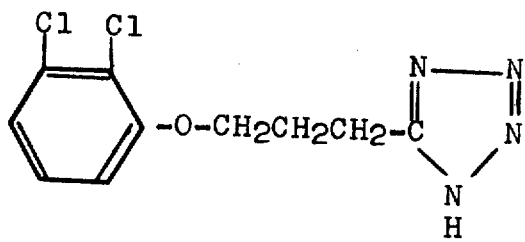

(column 6, lines 56-60)

SIGNED AND
SEALED
AUG 25 1970

(SEAL)
Attest:

Edward M. Fletcher, Jr.
Attesting Officer

WILLIAM E. SCHUYLER, JR.
Commissioner of Patents